US009877422B2

(12) United States Patent
Van Den Engel et al.

(10) Patent No.: US 9,877,422 B2
(45) Date of Patent: *Jan. 30, 2018

(54) DRAWN AGRICULTURAL MACHINE

(71) Applicant: LELY PATENT N.V.

(72) Inventors: Alfonsus Jacobus Van Den Engel, Schiedam (NL); Norbert Van Hemert, Rotterdam (NL)

(73) Assignee: LELY PATENT N.V., Maassluis (NL)

( * ) Notice: Subject to any disclaimer, the term of this patent is extended or adjusted under 35 U.S.C. 154(b) by 79 days.

This patent is subject to a terminal disclaimer.

(21) Appl. No.: 14/108,406

(22) Filed: Dec. 17, 2013

(65) Prior Publication Data

US 2014/0102069 A1 Apr. 17, 2014

Related U.S. Application Data

(63) Continuation of application No. 12/741,239, filed as application No. PCT/NL2008/000210 on May 4, 2010, now Pat. No. 8,646,798.

(30) Foreign Application Priority Data

Nov. 5, 2007 (NL) ..................................... 1034636

(51) Int. Cl.
*A01B 73/00* (2006.01)
*A01B 73/02* (2006.01)
(Continued)

(52) U.S. Cl.
CPC ............ *A01B 73/02* (2013.01); *A01B 63/145* (2013.01); *A01D 78/006* (2013.01)

(58) Field of Classification Search
CPC .......................... A01D 78/1078; A01B 73/065
(Continued)

(56) References Cited

U.S. PATENT DOCUMENTS 3,463,510 A 8/1969 Van Syoc
4,596,290 A 6/1986 Bedney
(Continued)

FOREIGN PATENT DOCUMENTS

DE 1811163 C3 9/1977
EP 0951818 B1 12/2002
(Continued)

OTHER PUBLICATIONS

International Search Report for PCT/NL2008/000210 dated Jan. 29, 2009.

(Continued)

*Primary Examiner* — Robert Pezzuto
*Assistant Examiner* — Mai Nguyen
(74) *Attorney, Agent, or Firm* — Hoyng Rokh Monegier LLP; Ramin Amirsehhi; David P. Owen

(57) ABSTRACT

A drawn agricultural machine comprising a carrier frame for carrying processing members, the carrier frame supportable on the ground, at least during transport, by means of a wheel set comprising at least a wheel, a coupling frame for coupling the agricultural machine 1 to the three-point suspension of a tractor, the coupling frame comprising two lower coupling points and an upper coupling point and the coupling frame being rotatable about a vertical axis of rotation relative to the carrier frame. The machine also comprises a drawing element for exerting a force on the coupling frame, wherein the coupling frame, the carrier frame and the drawing element are interconnected in such a manner that a downward force component is exerted on the lower coupling points when the drawing element exerts a force on the coupling frame.

6 Claims, 2 Drawing Sheets

(51) Int. Cl.
*A01B 63/14* (2006.01)
*A01D 78/00* (2006.01)

(58) Field of Classification Search
USPC ............... 56/370, 218, 228; 172/310, 311;
280/414.5, 406.1, 476.1
See application file for complete search history.

(56) References Cited

U.S. PATENT DOCUMENTS

| | | | |
|---|---|---|---|
| 5,787,988 A * | 8/1998 | Harlan .................. | A01C 7/208 172/311 |
| 6,044,916 A * | 4/2000 | Hundeby ............... | A01C 5/062 172/448 |
| 6,206,105 B1 * | 3/2001 | Friesen ................ | A01B 73/065 111/54 |
| 6,616,167 B2 | 9/2003 | Guiet | |
| 6,702,035 B1 * | 3/2004 | Friesen ................ | A01B 73/065 172/311 |
| 7,562,719 B1 * | 7/2009 | Misenhelder ........ | A01B 73/065 172/311 |
| 8,646,798 B2 * | 2/2014 | Van Den Engel et al. ........................ | 280/414.5 |
| 2009/0236108 A1 | 9/2009 | Stark | |
| 2010/0230930 A1 * | 9/2010 | Van Den Engel et al. ........................ | 280/476.1 |

FOREIGN PATENT DOCUMENTS

EP 1668977 A2 6/2006
WO 2004032601 A1 4/2004

OTHER PUBLICATIONS

International Preliminary Report on Patentability for PCT/NL2008/000210 dated May 11, 2010.

* cited by examiner

DRAWN AGRICULTURAL MACHINE

CROSS REFERENCE TO RELATED APPLICATIONS

This application is a continuation of U.S. application Ser. No. 12/741,239 filed on 4 May 2010, now U.S. Pat. No. 8,646,798, which is a 371 of International application no. PCT/NL2008/000210 filed on Sep. 25, 2008, which claims priority from Dutch application number NL1034636 filed on Nov. 5, 2007.

BACKGROUND OF THE INVENTION

1. Field of the Invention

The invention relates generally to agricultural machines and more particularly to drawn agricultural machines of the type having a carrier frame for carrying processing members and being supportable on the ground, at least during transport, by means of a wheel set comprising one or more wheels.

2. Description of the Related Art

Drawn agricultural machines of this type are generally known. The carrier frame may be provided with a coupling frame which allows connection of the agricultural machine to the three-point suspension of a tractor at two lower coupling points and an upper coupling point. The coupling frame is in turn rotatable about a vertical axis of rotation relative to the carrier frame. One such agricultural machine is known from European patent application EP 1668977. This document discloses a drawn agricultural machine in the form of a rake with two rotors which are capable of being folded-in. In a transport position, the two rakes rest on the carrier frame which is supported on the ground via a wheel set having one single wheel. Owing to the fact that the described agricultural machine is connected to the tractor via a three-point linkage, extra pressure may be exerted on the lower drawbars of the tractor. This extra pressure is manually variable by varying the length of the top rod of the tractor, which is connected to the upper coupling point. The pressure on the lower drawbars depends on many factors, such as the angle made by the top rod with the lower drawbars of the tractor, the weight of the machine and the position of the centre of gravity of the machine.

A drawback of the above-mentioned agricultural machine is that the extra pressure may be difficult to adjust.

Thus, there is a particular need for a drawn agricultural machine by means of which the pressure to be applied to the lower coupling points is better manageable.

BRIEF SUMMARY OF THE INVENTION

The present invention seeks to address these and other problems by providing a drawn agricultural machine comprising a carrier frame for carrying processing members, which carrier frame is supportable on the ground, at least during transport, by means of a wheel set comprising at least a wheel, a coupling frame for coupling the agricultural machine to the three-point suspension of a tractor, which coupling frame comprises two lower coupling points and an upper coupling point and wherein the coupling frame is rotatable about a vertical axis of rotation relative to the carrier frame, and comprising a drawing element for exerting a force on the coupling frame, wherein the coupling frame, the carrier frame and the drawing element are interconnected in such a manner that a downward force component is exerted on the lower coupling points when the drawing element exerts a force on the coupling frame. By exerting force is meant applying a force actively and thus in a controlled manner. This may, for example, take place by means of a drawing element designed as a spring or a cylinder. By drawing element is not only meant an element which exerts a pulling force, but also comprises an element which is capable of exerting a pushing force.

Due to the fact that the drawing element is capable of actively exerting a force, the downward pressure can better be made manageable and will be variable within a larger range.

The drawing element may be directly disposed between the carrier frame and the upper coupling point. In this case, it is advantageous if the fastening of the drawing element to the carrier frame is located on the axis of rotation.

In a favorable embodiment, the coupling frame comprises a first frame portion and a second frame portion, which second frame portion is fitted to the first frame portion, rotatably about a tilt axis parallel to the line through the two lower coupling points, wherein the upper coupling point is fitted to the second frame portion and the lower coupling points are fitted to the first frame portion and wherein the drawing element connects the second frame portion to the first frame portion. This provides a compact and simple construction which makes it possible to control the pressure on the lower coupling points completely from the machine itself. In this case, the drawing element may also be attached to the front side of the second frame portion, in which case it may exert a pushing force, opposite to the normal direction of travel, on the second frame portion.

In a further favorable embodiment, the drawing element supports the second frame portion by means of an adjustable force. This makes it possible to take into account a displacement of the centre of gravity of the machine. In the transport position, the processing members often occupy another position than in the operative position, so that the centre of gravity of the entire machine will be located elsewhere. As a result, also the force exerted by the machine on the lower coupling points will be different. This may be compensated by making the force of the drawing element adjustable.

Preferably, the drawing element comprises a hydraulic drawing cylinder which is capable of being energized from a tractor in order to apply a drawing force to the second frame portion, which drawing force is rearward when viewed in the normal direction of travel. This construction makes it possible to control the pressure on the lower coupling points completely from the driver's seat.

In a favorable embodiment according to the invention, the drawing cylinder comprises a pressure chamber in order to exert a drawing force by applying pressure to the pressure chamber, and the agricultural machine comprises an accumulator, wherein the pressure chamber of the drawing cylinder is coupled to the accumulator. It is possible that in transport the hoses of the hydraulic connection of the tractor are uncoupled. In general, the coupling of the hydraulic hoses for coupling to the hydraulic connection on the tractor will automatically close the hoses in the uncoupled state. As a result, the oil is retained in the hoses. Tilting of the machine relative to the tractor, for example due to unevenness in the road, will lead to compression of the drawing cylinder. The pressure in the circuit will not find its way out and damage the circuit or exert unwanted forces on the tractor, which may lead to dangerous driving behavior. By using the accumulator, the oil can find its way out within the accumulator and these negative effects will not occur.

It is further advantageous if the agricultural machine comprises processing members which are capable of being brought into a transport position and into an operative position by means of a folding-in device. This folding-in device is in particular capable of being activated by a folding-in cylinder.

In a favorable embodiment, a chamber of the folding-in cylinder is coupled to the pressure chamber of the drawing cylinder in such a manner that there is exerted a force on the upper coupling point when the folding-in device is activated. When the processing members are folded-in, the centre of gravity of the machine changes and thus also the pressure on the lower coupling points. Owing to the fact that the drawing cylinder is energized simultaneously with the folding-in cylinder, the pressure on the lower coupling points is adapted at the same time.

In a further favorable embodiment, in the operative position and viewed in the direction of travel, the processing members are fitted to the carrier frame behind the wheel set. In such a construction, there occurs a lever action of the weight of the processing members on the coupling frame. This means that the pressure on the lower coupling points is reduced when the processing members are lifted from the ground. For this purpose, it is especially necessary to adjust the pressure on the lower coupling points by activating the drawing element.

In a particular embodiment, in the transport position and viewed in the direction of travel, the combined centre of gravity of the processing members is in front of the combined centre of gravity of the processing members in the operative position.

In a further particular embodiment, in the transport position, the combined centre of gravity of the processing members is in front of the wheel set. In such a position of the centre of gravity in the transport position, the weight of the processing members increases the pressure on the lower coupling points. In this case, special help from the drawing element is not needed, so that the drawing element need not be active.

In one embodiment according to the invention, the agricultural machine comprises elongate wings having processing members on both sides of the carrier frame, which wings extend sideward from the carrier frame in the operative position and parallel to the direction of travel in the transport position This construction enables a compact transport position and makes the machine also easily transportable because the machine is only supported on the wheel set which may especially be made suitable for road transport.

By attaching the processing members to a central processing frame, there is created a construction which is drivable by means of one single drive mechanism and which is movable into and from the operative position by means of one single device.

In a favorable embodiment, the central processing frame is pivotably attached to the carrier frame, and the folding-in cylinder is connected to the central processing frame. Such a construction enables in a simple manner that, by means of one single folding-in cylinder, the machine can be brought into a headland position by tilting the central processing frame. The processing members are lifted to some extent by the tilting movement, in such a manner that they no longer perform a processing operation on a crop on the ground.

In a further favorable embodiment, the upper coupling point comprises a slotted hole. This construction allows, without further measures being necessary, small tilting movements of the agricultural machine relative to the tractor resulting from irregularities in the ground.

It is advantageous if the processing members are tedder rotors for picking up and lifting crop lying on the ground.

Such machines often have a large working width and the wheel set should not disarrange the lifted crop. Here, the aforementioned favorable features come out well.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
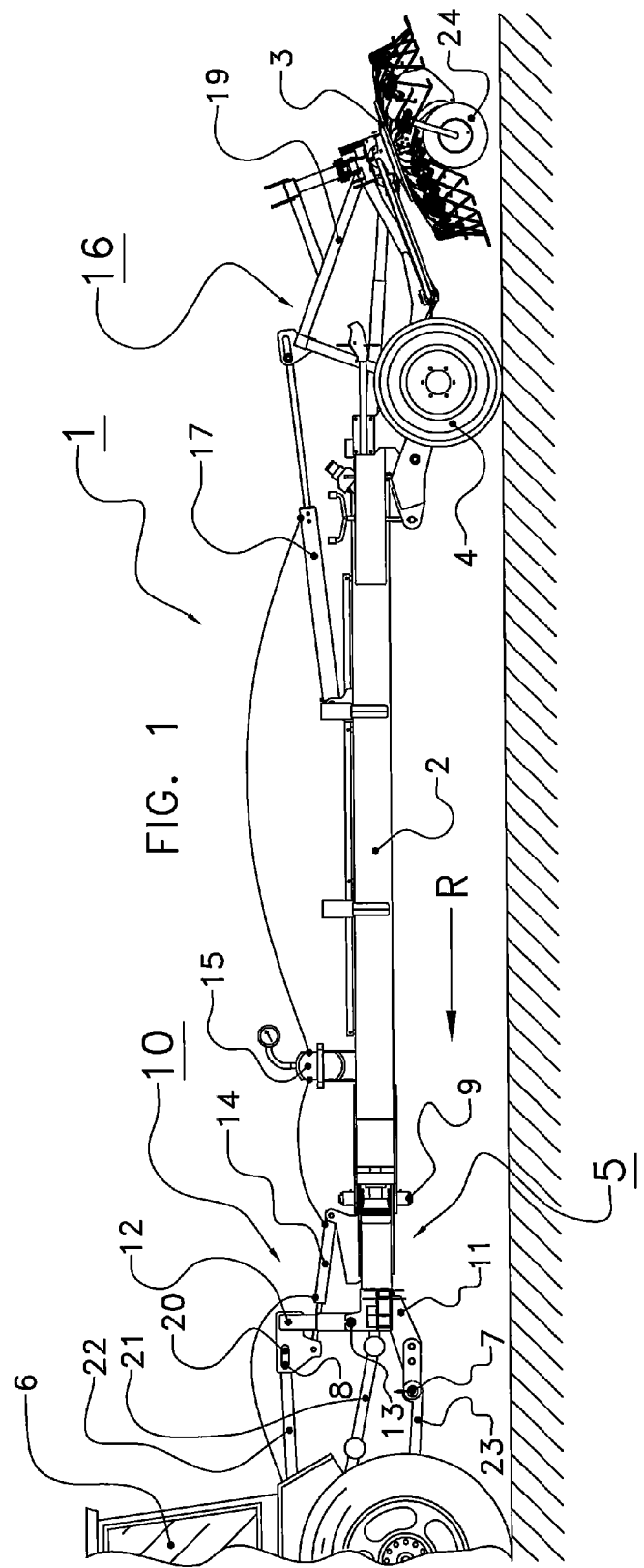
FIG. 1 shows a side view of a drawn agricultural machine according to the invention comprising tedder rotors and coupled to a tractor.

The following is a description of certain embodiments of the invention, given by way of example only and with reference to the drawings. FIG. 1 shows a drawn agricultural machine 1 comprising a carrier frame 2 for carrying processing members 3, which carrier frame 2 is supportable on the ground, at least during transport, by means of a wheel set comprising at least a wheel 4, a coupling frame 5 for coupling the agricultural machine 1 to the three-point suspension of a tractor 6, which coupling frame 5 comprises two lower coupling points 7 and an upper coupling point 8 and wherein the coupling frame 5 is rotatable about a vertical axis of rotation 9 relative to the carrier frame 2, and comprising a drawing element 10 for exerting a force on the coupling frame 5, wherein the coupling frame 5, the carrier frame 2 and the drawing element 10 are interconnected in such a manner that a downward force component is exerted on the lower coupling points 7 when the drawing element 10 exerts a force on the coupling frame 5. The shown agricultural machine 1 is a tedder for picking up and lifting crop lying on the ground by means of processing members 3 in the form of tedder rotors and is depicted in the operative position. In this position, the rotors 3 are each supported on the ground by means of their own support wheel 24.

The coupling frame 5 comprises a first frame portion 11 and a second frame portion 12, which second frame portion 12 is fitted to the first frame portion 11 about a tilt axis 13 parallel to the line through the two lower coupling points 7, wherein the upper coupling point 8 is fitted to the second frame portion 12 and the lower coupling points 7 are fitted to the first frame portion 11 and wherein the drawing element 10 connects the second frame portion 12 to the first frame portion 11. The drawing element 10 is designed in the form of a hydraulic drawing cylinder 14 and is suitable for applying a drawing force to the second frame portion 12, which drawing force is rearward when viewed in the normal direction of travel R. The drawing cylinder 14 comprises a pressure chamber for exerting a drawing force by applying pressure to the pressure chamber and the agricultural machine 1 comprises an accumulator 15, wherein the pressure chamber of the drawing cylinder 10 is coupled to the accumulator 15. This pressure chamber is connected in a manner known per se to the hydraulic system of the tractor 6.

In a not shown embodiment, the drawing element 10 is designed as a powerful spring. The drawing force of this spring is manually adjustable by means of a spindle.

In order to bring the processing members 3 into and from an operative position, the agricultural machine 1 comprises a folding-in device 16 which is capable of being activated by a folding-in cylinder 17. A chamber of the folding-in cylinder 17 is coupled to the pressure chamber of the drawing cylinder 10 in such a manner that a force is exerted on the upper coupling point 8 when the folding-in device 16 is activated. The processing members 3 are attached to a central processing frame 19 which is pivotably attached to the carrier frame 2, the folding-in cylinder 17 being connected to the central processing frame 19.

The upper coupling point 8 is designed as a slotted hole 20. The fixed top rod 22 is connected hereto by means of a pin. The lifting arms 23 of the tractor 6 are connected to the lower coupling points 7. The tedder rotors 3 are capable of being driven in a known manner by the tractor via a coupling shaft 21.

Figure 2:
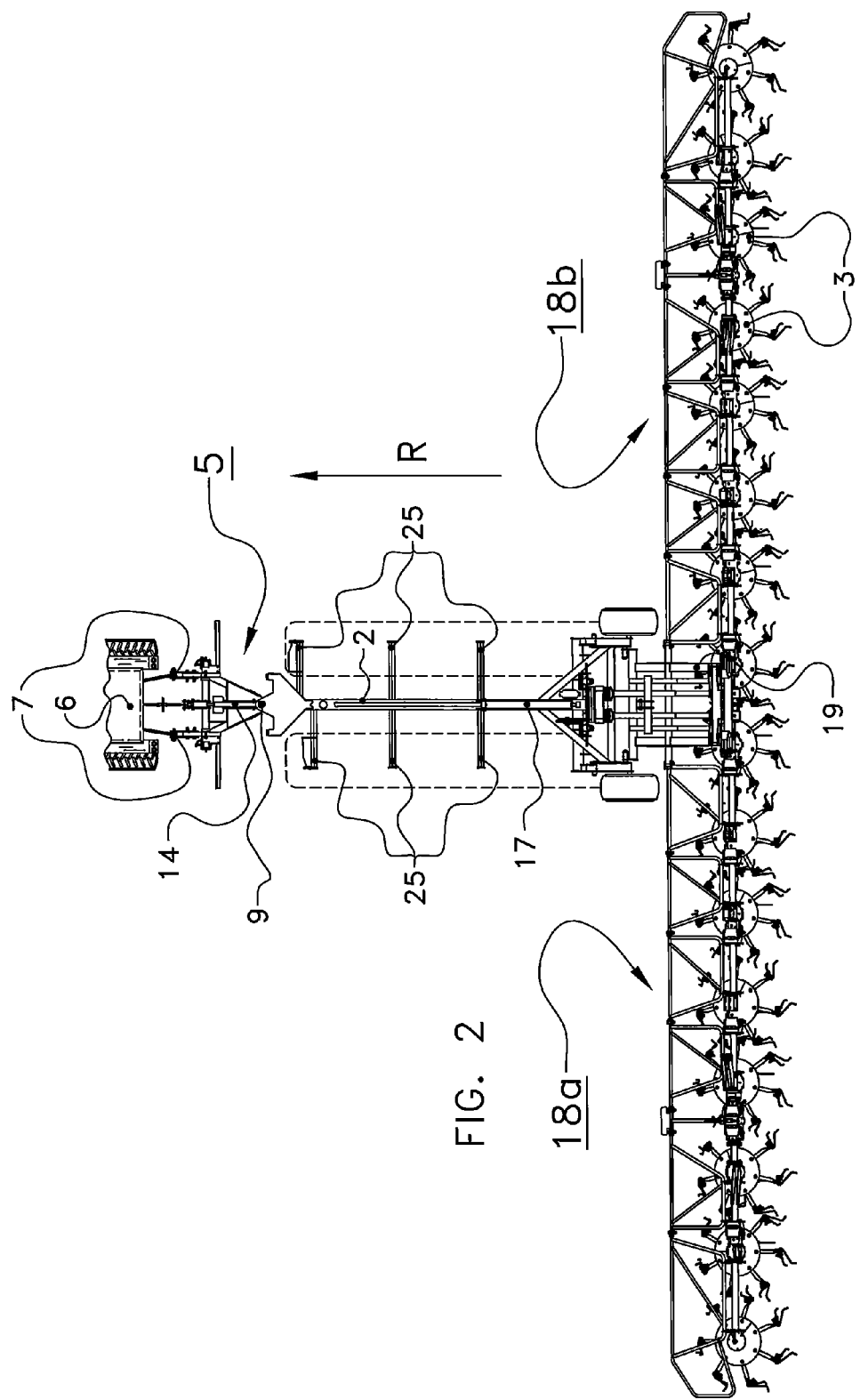
FIG. 2 shows a complete top view of a drawn agricultural machine according to the invention comprising tedder rotors and coupled to a tractor.

FIG. 2 shows an identical agricultural machine 1 as depicted in a top view in FIG. 1. The agricultural machine 1 comprises elongate wings 18A, 18B having processing members 3 on both sides of the carrier frame 2, which wings 18A, 18B extend sideward from the carrier frame 2 in the operative position and parallel to the direction of travel R in the transport position. In the transport position, each wing 18A, 18B is folded-in in two portions, the three outer rotors 3 of each wing 18A, 18B being rotated over 180 degrees. The wings 18A, 18B then rest on the support arms 25 of the carrier frame 2. The position of the two wings 18A, 18B in the transport position is diagrammatically depicted by an interrupted line. In the transport position, the combined centre of gravity of the processing members 3 is in front of the wheel set.

In the operative position, the circuit of the drawing cylinder 14, the folding-in cylinder 16 and the accumulator 15 is not energized. The tedder rotors 3 rest on the ground by means of their support wheels 24 and can freely move in height within particular limits. Owing to the fact that the central processing frame 19 is connected to the folding-in cylinder 16 via a slotted hole it is capable of freely tilting in order to be able to follow the ground. Because the circuit is not energized, the second frame portion 12 can freely move about the tilt axis 13. Surplus oil can flow back to the tractor 6 or be collected in the accumulator 15. In the operative position, the weight of the carrier frame 2 will exert sufficient pressure on the lower coupling points 7.

When the machine is brought into the transport position, first a headland position will be assumed. For this purpose, the tractor driver energizes the aforementioned circuit as a result of which the drawing cylinder 14 and the folding-in cylinder 17 are activated simultaneously. A not shown cylinder is included in the same circuit and draws the wings 18A, 18B upward to some extent. When the processing members 3 are lifted from the ground, the combined centre of gravity of the processing members 3 will have a lever effect on the wheels and exert an upwardly orientated force on the coupling frame 5. The pressure in the circuit makes the drawing cylinder 14 draw the second frame portion 12 rearward. As a result, the pressure on the lower coupling points 7 increases and compensates the lever effect. In order to be able to control the force of the drawing cylinder 14, the drawing cylinder 14 is connected to the second frame portion 12 via a not-shown spindle.

The folding-in device 16 also comprises further cylinders which make the outer three rotors of each wing 18A, 18B fold inward over 180 degrees. Subsequently, the central processing frame 19 with the rotors 3 further tilts forward to an angle of approximately 80 degrees. The last step is folding forward the two wings 18A, 18B above the carrier frame 2. When the folding-in cylinder 17 has been withdrawn completely, the two wings 18A, 18B rest on the lifting arms 23 of the carrier frame 2. The tractor driver finally removes the pressure from the circuit so that also the drawing cylinder 14 becomes pressureless and no longer exerts a downward force on the lower coupling points 7. The combined centre of gravity of the processing members 3 is now in front of the wheel set and thus effects a sufficient downward pressure on the lower coupling points 7.

Thus, the invention has been described by reference to certain embodiments discussed above. It will be recognized that these embodiments are susceptible to various modifications and alternative forms well known to those of skill in the art. For example, the invention is not limited to the described embodiment in the form of a hay tedder. The invention may also be applied in an agricultural machine in which the processing members are designed as ground processing members. In the case of such agricultural machines it is advantageous if the processing members are disposed behind the wheel set, so that the wheels are no longer able to disarrange the processed ground. The drawn agricultural machine may also constitute part of a self-propelled agricultural machine in which the tractor and the agricultural machine are integrated.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:
1. A drawn agricultural machine comprising:
a carrier frame for carrying processing members, the carrier frame supportable on the ground, at least during transport, by means of a wheel set comprising at least one wheel;
a coupling frame for coupling the agricultural machine to a three-point suspension of a tractor at two lower coupling points and an upper coupling point, the coupling frame being rotatable about a vertical axis of rotation relative to the carrier frame;
a folding-in device to bring the processing members from a transport position to an operative position and arranged for actuation by a folding-in cylinder,
wherein, in the transport position, a combined centre of gravity of the processing members is in front of a combined centre of gravity of the processing members in the operative position as viewed in the direction of travel, and
wherein, in the transport position, the combined centre of gravity of the processing members is in front of the wheel set, and
wherein the processing members are attached to a central processing frame, the central processing frame is pivotably attached to the carrier frame, and the folding-in cylinder is connected between the carrier frame and the central processing frame;
elongate wings having processing members on both sides of the central processing frame, which wings extend sideward from the central processing frame in the operative position and parallel to the direction of travel in the transport position;
a drawing element for exerting a force on the coupling frame, wherein the drawing element is a spring or a cylinder, and wherein the coupling frame, the carrier frame and the drawing element are interconnected in such a manner that a downward force component is exerted on the lower coupling points when the drawing element exerts a force on the coupling frame.

2. The drawn agricultural machine according to claim 1, wherein the drawing element comprises a hydraulic drawing cylinder and a chamber of the folding-in cylinder is coupled to the pressure chamber of the drawing cylinder in such a manner that there is exerted a force on the upper coupling point when the folding-in device is activated.

3. The drawn agricultural machine according to claim 1, wherein, in the operative position and viewed in the direction of travel, the processing members are fitted to the carrier frame behind the wheel set.

4. The drawn agricultural machine according to claim 1, wherein the upper coupling point comprises a slotted hole.

5. The drawn agricultural machine according to claim 1, wherein the processing members are tedder rotors for picking up and lifting crop lying on the ground.

6. The drawn agricultural machine according to claim 1, wherein the drawing element comprises a spring having an adjustable drawing force.

\* \* \* \* \*